Jan. 27, 1953  F. J. LANGE ET AL  2,626,775
VALVE
Filed Aug. 21, 1948  3 Sheets-Sheet 1

INVENTORS.
FREDERICK J. LANGE
FRANK H. TEMPLE
BY William Seler
ATTORNEY.

Jan. 27, 1953  F. J. LANGE ET AL  2,626,775
VALVE

Filed Aug. 21, 1948  3 Sheets-Sheet 2

INVENTORS
FREDERICK J. LANGE
FRANK H. TEMPLE
BY
*William Isler*
ATTORNEY

Jan. 27, 1953

F. J. LANGE ET AL 2,626,775

VALVE

Filed Aug. 21, 1948

INVENTORS.
FREDERICK J. LANGE
FRANK H. TEMPLE
BY William Isler
ATTORNEY

Patented Jan. 27, 1953

2,626,775

UNITED STATES PATENT OFFICE 2,626,775

VALVE

Frederick J. Lange, Parma, and Frank H. Temple, Cleveland, Ohio; said Lange assignor to said Temple Application August 21, 1948, Serial No. 45,486

4 Claims. (Cl. 251—167)

1

This invention relates, as indicated, to valves, but has reference more particularly to gate valves.

In gate valves of conventional types, when certain parts, particularly the valve body, became worn or broken, it became necessary to replace the entire valve. This was due, in large measure, to the massiveness of construction of the valve body, particularly those in which the flanges were formed integrally with the valve body. In the manufacture of such valves, a great deal of time was consumed in machining, grinding and fitting the seat sleeves or wedge seats to the body seats, for the reason that the body casting had irregular and complex sections, and in the cooling of the casting, warpage and distortion occurred, which could not be controlled.

A primary object of the present invention is to provide a gate valve which is of such construction as to obviate the aforesaid disadvantages, the invention being generally characterized by the fact that the valve consists of parts which can be quickly and easily assembled and disassembled, the parts being so designed as to permit replacement of one or more parts or any part without destruction or loss of the valve as a whole.

Another object of the invention is to provide a gate valve of the character described consisting of parts which are readily interchangeable with corresponding parts of similar valves, thereby adapting the valve for mass production, accurate machining and assembling.

A further object of the invention is to provide a gate valve of the character described, having seat sleeves which can be quickly and easily located axially as well as circumferentially with respect to the valve body or ports, and which can be removed for repair or replacement purposes by movement thereof away from the valve body, as contrasted with prior valves of this type in which the valve seat sleeves had to be removed upwardly through a chamber in the valve body.

A still further object of the invention is to provide a gate valve of the character described, the body of which is cast in separate parts, the center of the valve body being characterized by the fact that the metal thereof is evenly and uniformly distributed, and the end flanges by the fact that they are of extremely simple construction so that they can be easily cast, thereby effecting a considerable saving in time and expense of manufacture.

A still further object of the invention is the provision of novel means for locating the seat

2 sleeves circumferentially with respect to the valve body or ports.

Other objects and advantages of the invention will be apparent during the course of the following description.

In the accompanying drawings, forming a part of this specification, and in which like numerals are employed to designate like parts throughout the same, Fig. 1 is an end elevational view of a gate valve embodying the principal features of the invention;

Referring more particularly to Figs. 1 to 8 inclusive of the drawings, there is disclosed a gate valve of the rising stem type, comprising a valve body 1, in the form of a casting, preferably of cast iron, the upper portion 2 of which is of substantially rectangular cross-section, provided with a flange 3, and the lower portion of which is rounded or substantially semi-circular, as at 4, and is provided with annular tapered flanges 5 and 6.

Figure 7:
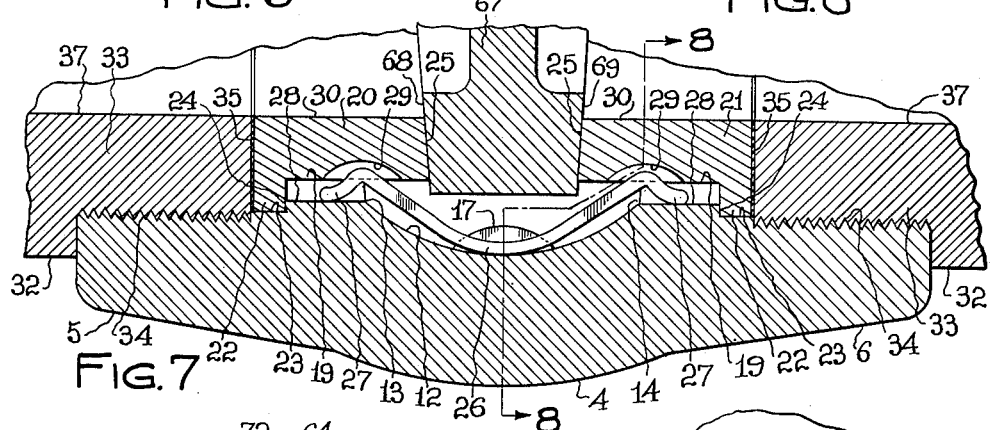
Fig. 7 is a detail, on an enlarged scale, of a portion of the valve shown in Fig. 4.

The valve body 1 has a wedge-shaped cavity 7, which is defined by parallel end walls 8 and 9, and non-parallel or inclined side walls 10 and 11. The walls 8 and 9 are interconnected at their lower edges by a substantially semi-circular bottom 12, which, as best shown in Fig. 7, is of arcuate form in its transverse cross-sectional aspect. The walls 10 and 11 terminate at the edges 13 and 14 respectively of the bottom 12.

Figure 1:
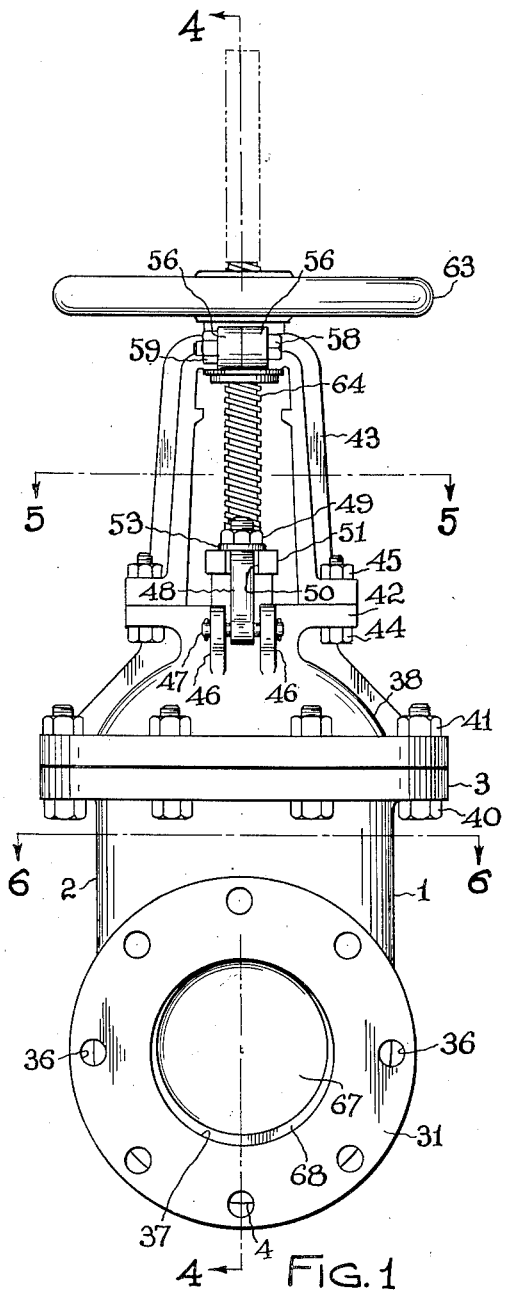
Figure 2:
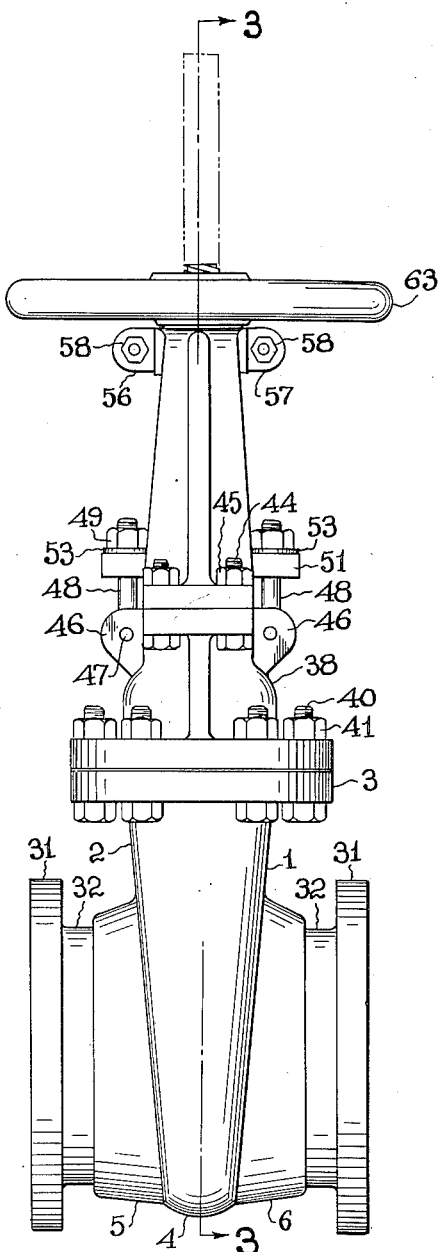
Fig. 2 is a side elevational view of the valve.
Figure 3:
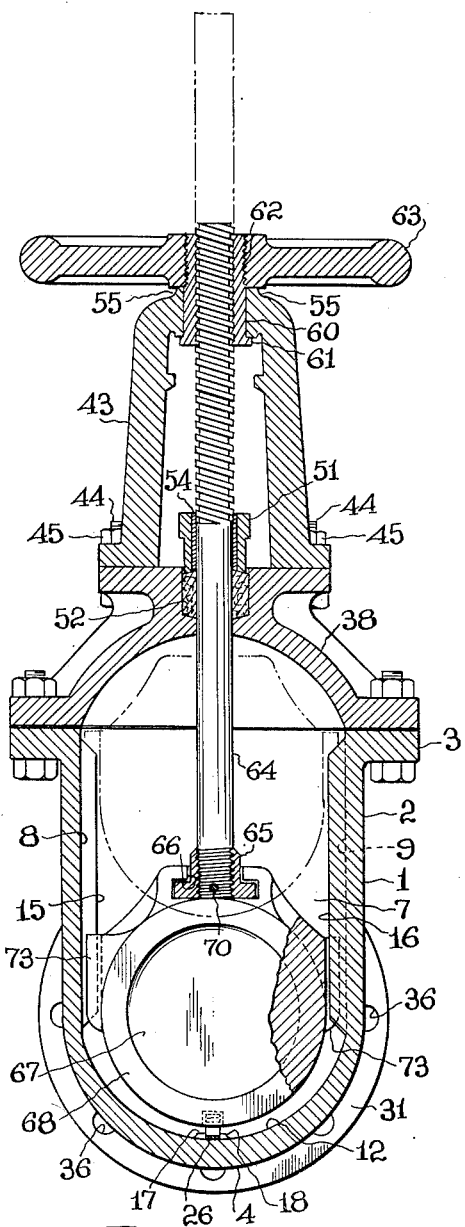
Fig. 3 is a vertical cross-sectional view of the valve, taken on the line 3—3 of Fig. 2.
Figure 6:
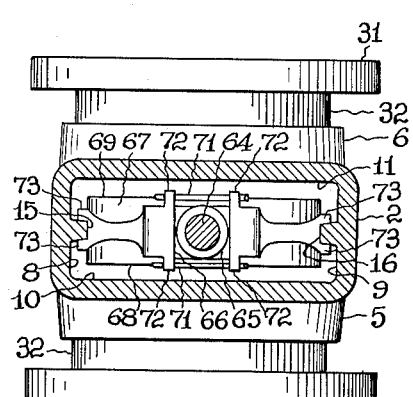
Fig. 6 is a transverse cross-sectional view of the valve, taken on the line 6—6 of Fig. 1.

The valve body 1 is further provided with vertically-extending ribs 15 and 16, Figures 3 and 6, which are formed integrally with the valve body and project inwardly from the walls 8 and 9 respectively. These ribs 15 and 16 serve a purpose to be presently described. The valve body further includes a pair of spaced abutments 17 and 18 (Figures 7 and 8), formed integrally with the valve body and projecting upwardly from the bottom 12, these abutments serving a purpose to be presently described.

The valve body is provided with a bore 19 (Figures 4, 7 and 8), for the reception of wedge seat sleeves 20 and 21, preferably in the form of bronze pressure castings, of annular form, each sleeve having a slide fit in the bore 19 and being provided with a radial flange or shoulder 22 which is disposed in a counterbore 23 of the valve body, the flange 22 bearing against an end wall 24 of the counterbore 23 to thereby properly locate the sleeve axially with respect to the bore 19. The sleeves 20 and 21 are provided with inclined ends 25 which form seats for the wedge or gate valve to be presently described.

For the purpose of properly locating the sleeves 20 and 21 circumferentially with respect to the bores 19, we have provided a novel spring 26 (Figures 4, 7 and 8), made of flat spring stock, and of substantially V-shape, and provided with downturned ends 27. The central portion of this spring is retained between the abutments 17 and 18, which thus serve to accurately locate the spring within the valve body and the ends 27 of the spring normally rest in keyways 28 formed for this purpose in the lower portions of the bores 19. The sleeves 20 and 21 are provided with recesses 29, in which portions of the ends of the spring 26 are disposed (Figures 7 and 8), thereby accurately locating the sleeves circumferentially with respect to the bores 19. It may be noted, at this point, that this method of locating the sleeves circumferentially with respect to the bores 19 renders unnecessary the use of separate elements, such as keys, heretofore used for this purpose, and saves considerable time in assembling the parts of the valve, since the resiliency of the spring permits the sleeves to be pushed to proper position, the ends of the spring yielding downwardly during such insertion of the sleeves, and then snapping upwardly into the recesses 29 when the sleeves have been properly located, as in Fig. 7.

The sleeves 20 and 21 are provided with bores 30, which are in axial alignment with each other and provide passageways for the fluid which passes through the valve.

The sleeves 20 and 21 are retained against axial displacement from the valve body by means of end flanges 31, preferably in the form of cast iron castings, each of which is provided with a portion 32 of reduced diameter, which bears against the tapered flanges 5 and 6 of the valve body, and with a second portion 33 of an external diameter smaller than that of the portion 32, and which is externally threaded for connection to the internal threads 34 of the flanges 5 and 6. The threads 34 are formed by counterboring the counterbores 22 and then threading the counterbores thus formed. In order to provide an effective fluid-tight seal between the sleeves 20 and 21 and the flanges 31, fibre gaskets 35 are interposed between the sleeves and flanges, as best shown in Fig. 7. The flanges 31 are also provided with circumferentially-spaced openings 36 adapted for engagement by a special wrench for screwing and unscrewing the flange from the valve body.

The flanges 31 are provided with bores 37, which are in axial alignment with each other and with the bores 30 in the sleeves 20 and 21. These bores have smooth walls, which, it may be noted, are, in effect, continuations of the walls of the bores 30, so that fluid passing through the valve has a smooth, uninterrupted flow.

The valve further includes a bonnet 38, preferably in the form of a cast iron casting, having a lower flange 39, which is secured to the flange 3 of the valve body by means of bolts 40 and nuts 41, and an upper flange 42, to which a cast-iron yoke 43 is secured, as by means of bolts 44 and nuts 45.

The bonnet is provided with pairs of laterally-spaced ears 46, formed integrally with the bonnet, and in which pins 47 are mounted. Pivotally secured to the pins 47 are eye-bolts 48, which are threaded for the reception of nuts 49. The upper ends of the bolts 48 are normally disposed within slots or recesses 50 in the opposite sides of a gland 51, which serves to retain a packing 52 in the upper end of the bonnet. The gland may be adjusted to compress the packing 52 by turning the nuts 49 down, washers 53 being interposed between these nuts and the gland. The gland 51 is provided with a liner bushing 54, of bronze or the like.

Figure 4:
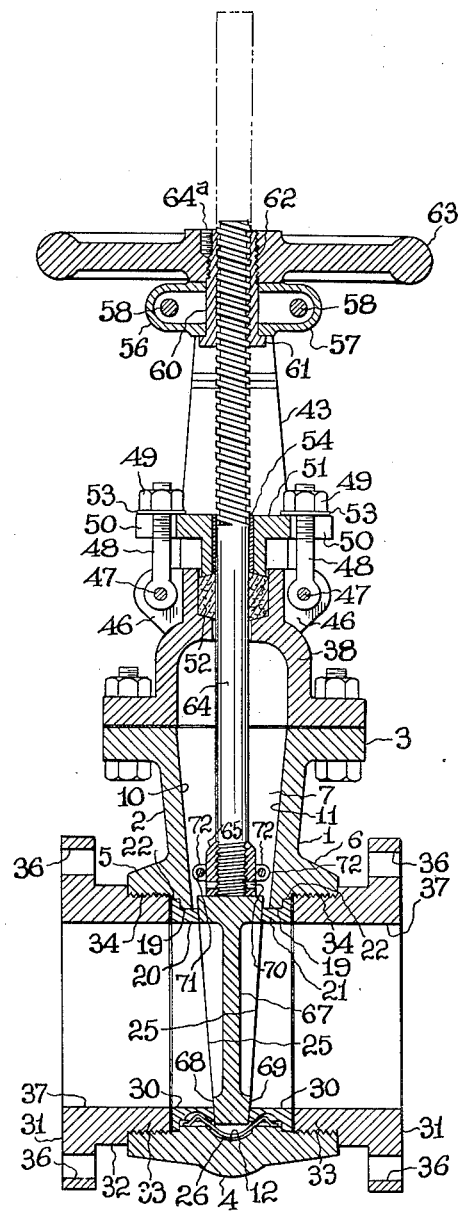
Fig. 4 is a vertical cross-sectional view of the valve, taken on the line 4—4 of Fig. 1.
Figure 5:
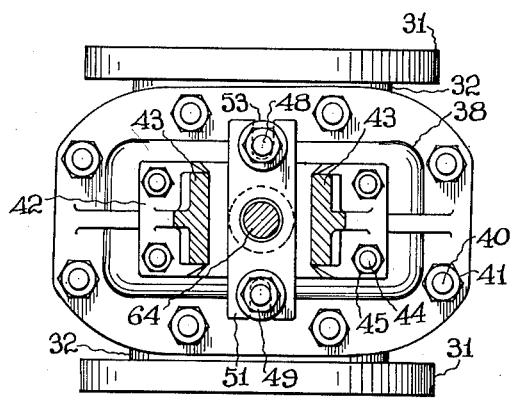
Fig. 5 is a transverse cross-sectional view of the valve, taken on the line 5—5 of Fig. 1.

The yoke consists of two arms, each of which is provided at its upper end with a hub portion 55, from which a pair of lugs 56 and 57 extends, the lugs of one hub portion being secured to the corresponding lugs of the other portion by means of bolts 58 and nuts 59. Disposed within the hub formed by the hub portions 55 is a sleeve 60, of bronze or the like, having a flange 61 at its lower end which abuts the lower end of the hub, and having a threaded upper end 62, to which a hand wheel 63 is secured. When the hand wheel 63 has been threaded onto the sleeve 60 sufficiently to bring the flange 61 of the sleeve into engagement with the lower end of the hub 55, it is locked against rotation relatively to the sleeve by means of a hollow head set screw 64a (Fig. 4). In this way, the sleeve 63 is rotated by means of the hand wheel.

The sleeve 63 is internally threaded for the reception of a stem 64, preferably formed of brass rod, said stem passing through the bushing 54, packing 52 and bonnet 38 and having threadedly secured to the lower end thereof a T-nut 65. The head of this T-nut is disposed in a T-slot 66 formed in the upper portion of the wedge or gate 67 of the valve. The wedge or gate 67 is provided at opposite sides thereof with annular seating surfaces 68 and 69 which are adapted for seating on the surfaces 25 of the sleeves 20 and 21, being inclined to correspond with the inclination of the surfaces 25.

The T-nut is locked against rotation relatively to the stem 65 by means of a taper pin 70 which extends transversely through the nut and stem, and the nut is prevented from being displaced laterally from the T-slot 66 by means of cotter pins 71 (Figures 4 and 6), which extend across the open ends of the T-slot and are mounted in ears 72 formed integrally with the gate 67.

The gate 67 is also provided with pairs of spaced ribs 73, which, as shown in Figures 3 and 6, embrace the ribs 15 of the valve body, so as to be guided in its vertical movement by the ribs 15.

The operation of the valve as thus described will be readily apparent. The valve is shown with the gate in closed position, in which position, the surfaces 68 and 69 of the gate or wedge are seated on the surfaces 25 of the sleeves 20 and 21, so that passage of fluid through the valve is effectively precluded. Upon rotation of the hand wheel 63, in one direction, the gate or wedge is lifted to the position shown in dot-dash lines in Figure 3, thereby uncovering the ports 30 and 37, permitting the fluid to flow through the valve in a direct and unobstructed manner, which is aided by virtue of the fact that the walls 30 and 37 form, in effect, a smooth, continuous passage for the fluid.

The provision of the ribs 15 and 73 is highly advantageous in that they aid in quickly seating and unseating the gate or wedge.

When the sleeves 20 or 21 become pitted, worn, or otherwise unserviceable, they can be quickly and easily replaced. For this purpose, the flanges 31 are unscrewed from the valve body, so as to permit movement of the sleeves outwardly from the counterbores 23. Then, by movement of the gate or wedge 67 downwardly from the position shown in Fig. 4, the gate is effective to bend or push the ends of the spring 26 downwardly and out of the recesses 29 of the sleeves, permitting the sleeves to be then easily withdrawn from the valve body. The spring 26, incidentally, avoids fumbling with keys and other elements which might become lost or misplaced.

It is to be particularly noted that the valve consists of parts that can be quickly and easily assembled and disassembled, a feature which is of especial importance where replacement is required of one or more parts of the valve. If replacement of the wedge or gate 67 is required, it is only necessary to separate the bonnet 38 from the valve body, thereby quickly exposing the wedge for removal purposes. The wedge, moreover, is easily removable from the nut 65 and stem 64 by simply removing the cotter pins 71. The stem 64 can be quickly removed from the bonnet and yoke by merely separating the two parts of the yoke, removing the handwheel 63 from the sleeve 60, and sliding the stem through the bonnet. The packing 52 can be easily replaced by removing the yoke and associated elements, swinging the bolts 48 downwardly, sliding the gland and sleeve off the stem and then removing the packing. Other details of construction which facilitate assembly and disassembly, and removal and replacement of parts will be obvious from a mere inspection of the drawings.

Another feature to be noted is the fact that the sleeves 20 and 21 can be quickly and easily located axially as well as circumferentially, with respect to the ports 19, and that these sleeves can be removed by movement thereof away from the valve body, as contrasted with prior constructions in which the valve seat sleeves had to be removed upwardly through a chamber, such as 7, in the valve body.

Another feature which cannot be stressed too strongly is the interchangeability of the various parts of the valve, a feature which depends not only on the manner in which the various parts of the valve are assembled, but on the specific construction of various parts, as well. In conventional types of gate valves, when certain parts, such as the valve body, became worn or broken, it became necessary to replace the whole valve. This was due, in large measure, to the massiveness of construction of the valve body, particularly those in which the flanges were formed integrally with the valve body. In the manufacture of such valves, a great deal of time was consumed in machining, grinding and fitting the seat sleeves or wedge seats to the body seats, for the reason that the body casting has irregular sections, and in the cooling-off process, warpage and distortion take place, which cannot be controlled.

In the present valve, however, the body of the valve, being cast in separate parts, the center of the valve body is characterized by the fact that the metal is evenly distributed, and the end flanges are of simple construction so that they can be easily cast, so that a considerable saving in time and expense is effected. All of the metal sections provide an ample factor of safety for maximum service rating of the valve. Moreover, this method of casting the valve body in sections permits the production of quality castings of uniform strength, possessing excellent physical properties and soundness, and permitting cleanliness in casting and ease of machining and fabricating. There are also very few casting rejects, the number of which, in the older and conventional types of valves, is enormous. The new valve is further characterized by a superior arrangement of parts and adaptability to any and all uses, all of the unit parts in corresponding sizes of valves being interchangeable and renewable. This makes the valve suitable for mass production, accurate machining and assembling. The provision of the sleeve seats 20 and 21 is of particular importance, in that they eliminate leakage and corrosion behind the sleeves, besides possessing other obvious advantages. The new method of constructing valves has the further advantage that it permits the valve to be quickly disassembled and reassembled, facilitating inspection and repair.

Other features of the valve which may be stressed are the following:

(a) The yoke is of strong and sturdy construction, is bolted to the bonnet, and is made in halves, making for easy replacement.

(b) The stuffing box is packed with formed-asbestos rings, and the gland can be screwed down to keep the packing under constant pressure.

(c) The eye-bolts for the stuffing box gland cannot be lost, therefore making for faster repacking.

(d) The gland and packing, as well as the packing seat, are beveled, thereby permitting packing under pressure.

(e) The bonnet is of strong construction and of uniform wall thickness.

(f) The stem threads are of coarse pitch, thereby permitting easier operation.

(g) The valve body is of simple design, but sufficiently heavy to afford requisite strength, and the gate or wedge guide-ribs are accurately machined to prevent chattering between the sleeve seats and wedge and to afford proper alignment.

(h) The connection of the stem to the gate or wedge is a free, yet positive, one, provided without the use of pins or screws. This connection prevents breakage of the stem, which often occurs when it is secured to the wedge by means of pins or screws.

(i) The gate or wedge is of heavy I-beam design to afford great strength, adding to the sturdiness of the valve, and being less subject to distortion in hot service than any other design. It permits also the use of full-size body guides. Moreover, the wedge is reversible, so that it may be reversed when it becomes worn on one side only, a condition which frequently results when the fluid flow is in one direction only.

(j) The flanged ends (as well as the screw ends to be presently described) are removable, and can be interchanged. The ends of these are accurately machined to provide an additional scale for the sleeve seats, and serve also as a lock-nut for the latter. This interchangeability of the flanged and screwed ends is a feature which is desirable to many users of such valves, for there is thus provided an economical changeover when necessity demands.

(k) The sleeve-ring gasket provides resiliency at the seat, making the joint more reliably tight.

(l) The body ports are carefully machined to receive the sleeves and insure a tight assembly.

(m) The seat sleeves are accurately machined, and their faces are in perfect taper. These sleeves are not screwed or forced into position, and are therefore not warped in the course of their installation. When worn out, they can therefore be easily replaced. No leaks can occur behind these sleeves, as in the common type of screwed-in sleeves or rings. Moreover, there will be no corrosion of threads, due to the chemical or electrolytic action which occurs between bronze and iron, and since there are no threads to become loosened, the danger of chattering is obviated. The sleeve construction provides ample strength to withstand the heavy thrust of the gate or wedge when the latter is seated.

(n) The tight assembly, good proportioning of the parts, and provision of metal sections of uniform thickness, gives strength to the valve to withstand not only the working pressure thereon, but the strains and stresses caused by expansion and contraction, as well.

(o) When the sleeves and flanges are replaced, the port walls of the valve are restored to their original strength, thickness and smoothness, providing minimum restriction to fluid flow.

Figure 9:
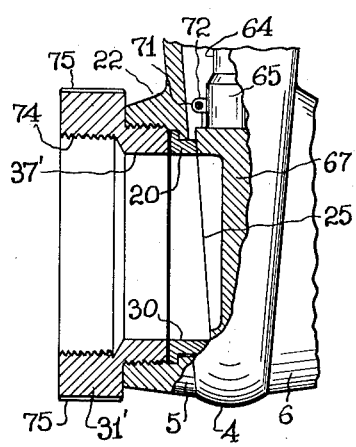
Fig. 9 is a fragmentary view, similar to Fig. 4, but showing a screw type collar on the valve.
Figure 8:
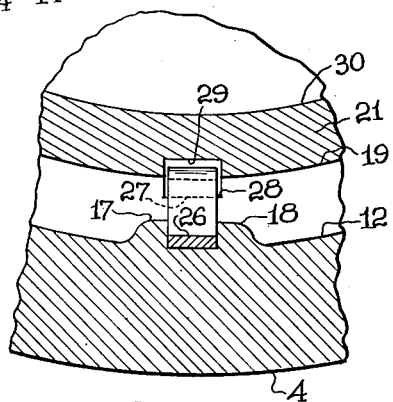
Fig. 8 is a fragmentary cross-sectional view, taken on the line 8—8 of Fig. 7.

Referring to Fig. 9 of the drawings, there is disclosed a valve which is identical with the valve described in Figs. 1 to 8 inclusive, with the exception that the flanged end 31 of the previously described form of valve, has been replaced by a screw-type collar 31' having a bore 37' equivalent in diameter to the bore 37 of the flanged collar 31. This collar 31' is provided with the conventional internal threads 74 for the coupling of the collar to pipe, and with conventional circumferentially-spaced grip lugs 75, for facilitating screwing and unscrewing of the collar with respect to the valve body. This figure is intended to show the easy interchangeability of the flanged and screw-type collar on this valve.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

Having thus described our invention, we claim:

1. In a gate valve of the character described, a valve body having openings therein, gate seat sleeves disposed in said body openings, said sleeves having recesses therein, and means comprising a spring of V-shaped form, disposed in the bottom of said valve body, and having end portions disposed within said recesses, whereby to lock said sleeves against displacement circumferentially relatively to said body openings.

2. A gate valve, as defined in claim 1, in which said spring is locked against displacement circumferentially with respect to said body, the ends of said spring being movable out of said recesses by the gate of said valve.

3. In a gate valve of the character described, a valve body having openings therein, gate seat sleeves disposed in said body opening, said sleeves having recesses therein, and means comprising a spring of V-shaped form, and having end portions disposed within said recesses, whereby to accurately locate said sleeves circumferentially with respect to said openings and to lock said sleeves against circumferential displacement relatively to said body openings.

4. A gate valve, as defined in claim 3, in which said spring is locked against displacement circumferentially with respect to said valve body, the ends of said spring being movable out of said recesses by the gate of said valve.

FREDERICK J. LANGE.
FRANK H. TEMPLE.

REFERENCES CITED

The following references are of record in the file of this patent:

UNITED STATES PATENTS

| Number | Name | Date |
|---|---|---|
| 275,798 | Beaumont | Apr. 17, 1883 |
| 594,634 | Luken | Nov. 30, 1897 |
| 871,085 | Claflin | Nov. 12, 1907 |
| 1,001,624 | Curtin | Aug. 29, 1911 |
| 1,034,370 | McCarty | July 30, 1912 |
| 2,030,458 | McKellar | Feb. 11, 1936 |
| 2,086,725 | McCausland | July 13, 1937 |

FOREIGN PATENTS

| Number | Country | Date |
|---|---|---|
| 627,228 | Germany | of 1936 |